(12) United States Patent
Ji et al.

(10) Patent No.: US 9,317,074 B2
(45) Date of Patent: Apr. 19, 2016

(54) ANTENNA MOUNTING FOR ELECTRONIC DEVICES

(75) Inventors: Gang Ji, Kawakaki (JP); Tetsuya Ohtani, Yokohama (JP); Takayuki Morino, Yamato (JP); Akinori Uchino, Yamato (JP)

(73) Assignee: Lenova (Singapore) Pte. Ltd., Singapore (SG)

( * ) Notice: Subject to any disclaimer, the term of this patent is extended or adjusted under 35 U.S.C. 154(b) by 1380 days.

(21) Appl. No.: 12/351,533

(22) Filed: Jan. 9, 2009

(65) Prior Publication Data

US 2009/0179806 A1  Jul. 16, 2009

(30) Foreign Application Priority Data

Jan. 11, 2008  (JP) .................................. 2008-004103

(51) Int. Cl.
*G06F 1/16* (2006.01)
*H01Q 1/24* (2006.01)

(52) U.S. Cl.
CPC ............ *G06F 1/1698* (2013.01); *G06F 1/1616* (2013.01); *G06F 1/1637* (2013.01); *G06F 1/1656* (2013.01)

(58) Field of Classification Search
USPC .............. 361/679.21, 679.26–679.27, 697.55
See application file for complete search history.

(56) References Cited

U.S. PATENT DOCUMENTS

| | | | | |
|---|---|---|---|---|
| 5,867,370 | A * | 2/1999 | Masuda ......................... | 361/800 |
| 6,642,892 | B2 * | 11/2003 | Masaki et al. ................. | 343/702 |
| 6,853,336 | B2 * | 2/2005 | Asano et al. ................... | 343/702 |
| 7,142,886 | B2 * | 11/2006 | Murayama et al. ........ | 455/556.1 |
| 7,298,335 | B2 * | 11/2007 | Usui et al. ..................... | 343/702 |
| 7,301,783 | B2 * | 11/2007 | Homer et al. ................. | 361/816 |
| 8,045,090 | B2 * | 10/2011 | Iijima ..................... | G06F 1/162 348/58 |
| 8,165,624 | B2 * | 4/2012 | Tseng ................... | B29C 43/203 343/702 |
| 8,379,164 | B2 * | 2/2013 | Ji ......................... | B29C 45/0001 348/794 |
| 8,576,372 | B2 * | 11/2013 | Ji ......................... | B29C 45/0001 348/794 |

(Continued)

FOREIGN PATENT DOCUMENTS

| | | | |
|---|---|---|---|
| JP | 03-20492 U1 * | 2/1991 | ............... H05K 9/00 |
| JP | H10-215080 | 8/1998 | |

(Continued)

OTHER PUBLICATIONS

English translation of Koike, JP 3-20492 U, dated Feb. 28, 1991, translated in Jun. 2012.*

*Primary Examiner* — Robert J Hoffberg
(74) *Attorney, Agent, or Firm* — Ference & Associates LLC

(57) ABSTRACT

The invention broadly contemplates an electronic apparatus that provides improved antenna characteristics, while maintaining a thin size and light weight. The electronic apparatus of the present invention includes a display casing having a nonconductive resin region and a conductive resin region in a bottom surface thereof; a display module accommodated in the display casing; an antenna disposed in the nonconductive resin region; and a system casing accommodating a wireless module connected to the antenna. By disposing the antenna in the nonconductive resin region formed in the bottom surface of the display casing, it is possible to secure high radio wave sensitivity while preventing an antenna mounting portion from being exposed to the outside of the display casing. The casing structure of the electronic apparatus does not become thick because of butt joining even when the joint portions are in a projection area of an LCD module.

19 Claims, 6 Drawing Sheets

(56) References Cited

U.S. PATENT DOCUMENTS

| | | | | |
|---|---|---|---|---|
| 8,658,268 | B2* | 2/2014 | Tabeya | B29C 45/1657 428/60 |
| 9,196,948 | B2* | 11/2015 | Yamamoto | H01Q 1/002 |
| 2005/0237443 | A1* | 10/2005 | Nakanishi et al. | 349/58 |
| 2009/0002931 | A1* | 1/2009 | Iijima | G06F 1/1601 361/679.27 |
| 2009/0130995 | A1* | 5/2009 | Wang Chen | 455/90.3 |
| 2009/0185340 | A1* | 7/2009 | Ji et al. | 361/679.21 |
| 2011/0117872 | A1* | 5/2011 | Tseng | 455/347 |
| 2015/0070310 | A1* | 3/2015 | Suzuki | G06F 1/1607 345/174 |

FOREIGN PATENT DOCUMENTS

| | | |
|---|---|---|
| JP | H11-298158 | 10/1999 |
| JP | 2002-032150 | 1/2002 |
| JP | 2002-232220 | 8/2002 |
| JP | 2002-314262 | 10/2002 |
| JP | 2004-280331 | 10/2004 |
| JP | 2005-136912 | 5/2005 |
| JP | 2005-149463 | 6/2005 |
| JP | 2006-013797 | 1/2006 |
| JP | 2008-3714 | 1/2008 |

* cited by examiner

ANTENNA MOUNTING FOR ELECTRONIC DEVICES

CLAIM FOR PRIORITY

This application claims priority from Japanese Patent Application No. 2008-004103, filed on Jan. 11, 2008, and which is fully incorporated by reference as if set forth herein.

FIELD OF THE INVENTION

The present invention generally relates to an electronic apparatus mounting an antenna thereon.

BACKGROUND OF THE INVENTION

In recent years, a portable computer such as a notebook type personal computer (hereinafter, referred to as "notebook PC") has been standardized to have a radio communication antenna. The radio communication antenna is disposed on an upper surface or a side surface of a liquid crystal display so that the antenna exhibits the optimum sensitivity when users use the notebook PC. In order to cope with recent demands such as broad and multiple frequency bands, a high data transfer rate, or a diversity communication, the number of antennas mounted on a display-side casing of the notebook PC has been more and more increased.

Japanese Patent Application Laid-Open No. 2005-149463 discloses an electronic apparatus casing in which a resin member for covering a distal end part of a base member containing a fiber is bonded to the base member by means of adhesive while preventing the adhesive from running over a joint surface of the resin member and the base member, thus covering a hangnail of the fiber at the distal end part. Japanese Patent Application Laid-Open No. 11-298158 discloses an electronic apparatus casing configured by a metal plate and wall parts formed of a composite heat-curable resin material, for coping with multiple purposes of, such as, a light weight, an electromagnetic shielding property, or a transformation. The metal plate and the wall parts are joined with each other in corrugated joint surfaces.

With further progress in the trend toward a thinner size and a lighter weight notebook PC, the structure of the display casing has been further evolved to cope with such progress. In a metallic display casing, the cutout portions for securing the antenna sensitivity have weak points in terms of strength while posing designing problems; hence, a display casing having a new structure is demanded. Therefore, a need has been recognized for an electronic apparatus, especially, such as a next-generation notebook PC, to have a display casing capable of achieving excellent antenna characteristics while being thin in size and lightweight.

SUMMARY OF THE INVENTION

The present invention generally relates to an electronic apparatus which includes a display casing having a nonconductive resin region and a conductive resin region in a bottom surface thereof; a display module accommodated in the display casing; an antenna disposed in the nonconductive resin region; and a system casing accommodating a wireless module connected to the antenna. By disposing the antenna in the nonconductive resin region formed in the bottom surface of the display casing, it is possible to secure high radio wave sensitivity while preventing an antenna mounting portion from being exposed to the outside of the display casing.

In accordance with at least one presently preferred embodiment of the invention, there is broadly contemplated herein an electronic apparatus which achieves good antenna characteristics, while being thin in size and lightweight.

In summary, one aspect of the invention provides an apparatus comprising: a display casing, the display casing comprising: a nonconductive resin region having an antenna mounting space disposed therein; a conductive resin region in a bottom surface of the display casing; and a display module accommodated in the display casing; and a system casing.

An additional aspect of the invention provides an apparatus comprising a display casing, the display casing comprising: a nonconductive resin region having an antenna mounting space disposed therein; and a conductive resin region in a bottom surface of the display casing.

A further aspect of the present invention provides an apparatus comprising: a system casing; and a display casing, the display casing comprising: a nonconductive resin region having an antenna mounting space disposed therein; and a conductive resin region in a bottom surface of the display casing.

For a better understanding of the present invention, together and with other and further features and advantages thereof, reference is made to the following description, taken in conjunction with the accompanying drawings, and the scope of the invention will be pointed out in the appended claims.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the presently preferred embodiments of the present invention, as represented in the figures, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices that are consistent with the invention as claimed herein. The detailed description of the invention will briefly review some conventional arrangements and problems associated therewith in order to highlight some features of the instant invention (providing solutions to these problems). The description will then proceed with a more detailed description of preferred embodiments according to the present invention.

Referring now to the figures, the instant invention will be described with reference to the figures herein and the scope of the invention will be pointed out in the pending claims.

Figure 6:
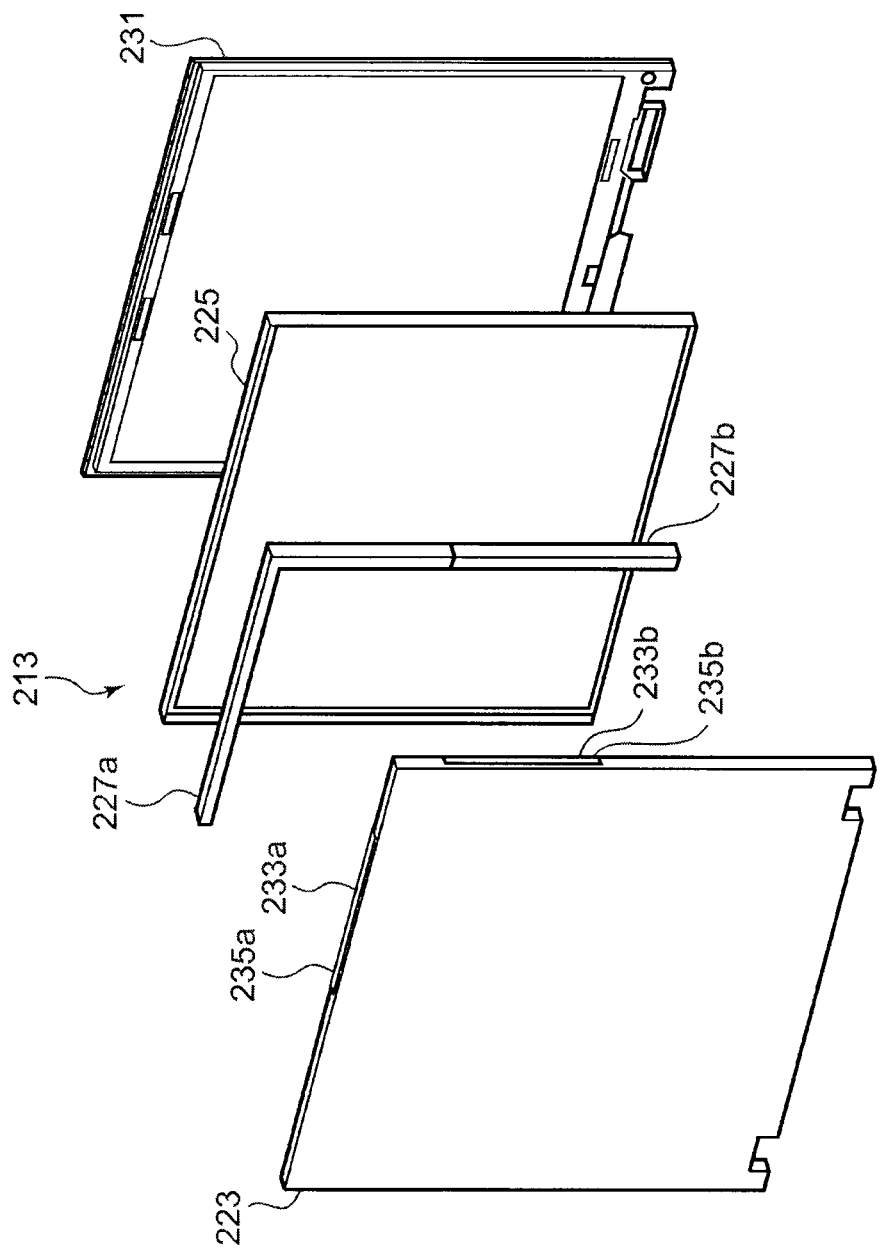
FIG. 6 is a perspective view for explaining a display casing and an LCD module.

FIG. 6 is a schematic perspective view illustrating a structure of a display portion 213 of a conventional notebook PC. The display portion 213 includes a display casing 223, a display module 225, antenna mounting portions 227a and 227b, and a bezel 231. A variety of types of radio communication antennas are mounted on the antenna mounting portions 227a and 227b. The display casing 223 has a box-like structure, and the display module 225 is fixedly accommodated therein. The antenna mounting portions 227a and 227b are disposed between a side portion of the display module 225 and an inner surface of the display casing 223. The bezel 231 is disposed on a front surface of the display module 225 to be mounted on the display casing 223.

The display casing 223 is a structure for protecting internal components of, for example, the display module 225 from an external pressing force. For this reason, the display casing 223 has usually been formed of a thick glass fiber reinforced plastic, but nowadays, in order to achieve a thin size and a light weight while maintaining strength of the casing, light metals such as aluminum alloys or magnesium alloys are often used.

When antennas mounted on the antenna mounting portions 227a and 227b are disposed inside the display casing 223 formed of a conductive material such as metal, the sensitivity may be lowered. For this reason, in the case of the display casing 223 formed of metal, a structure is typically used in which cutouts 233a and 233b are formed in parts of a side portion thereof corresponding to the antennas, and caps 235a and 235b configured by nonconductive members such as rubber or plastics are packed into the cutouts 233a and 233b.

However, when the cutouts 233a and 233b are formed in the display casing 223, the strength at these portions is inevitably lowered undesirably. For this reason, it is necessary to decide the structure of the display casing 223 with the presumption that the strength will be lowered by the cutouts 233a and 233b so that sufficient strength can be ensured. Particularly, when a plurality of antennas is mounted on one casing, the cutouts are required by the number of antennas mounted, so that it leads to a limit in achieving a thin size and light-weight in a metallic casing.

Furthermore, according to co-pending and commonly assigned Japanese Patent Application No. 2007-069947, a display casing is configured by a composite member including a decorative cover formed of a nonconductive material for contributing to designing function and a frame formed of metal for contributing to strengthening function. However, such a casing still poses problems in the form of increased number of members used or the weight thereof because of the metal used therein.

Figure 1:
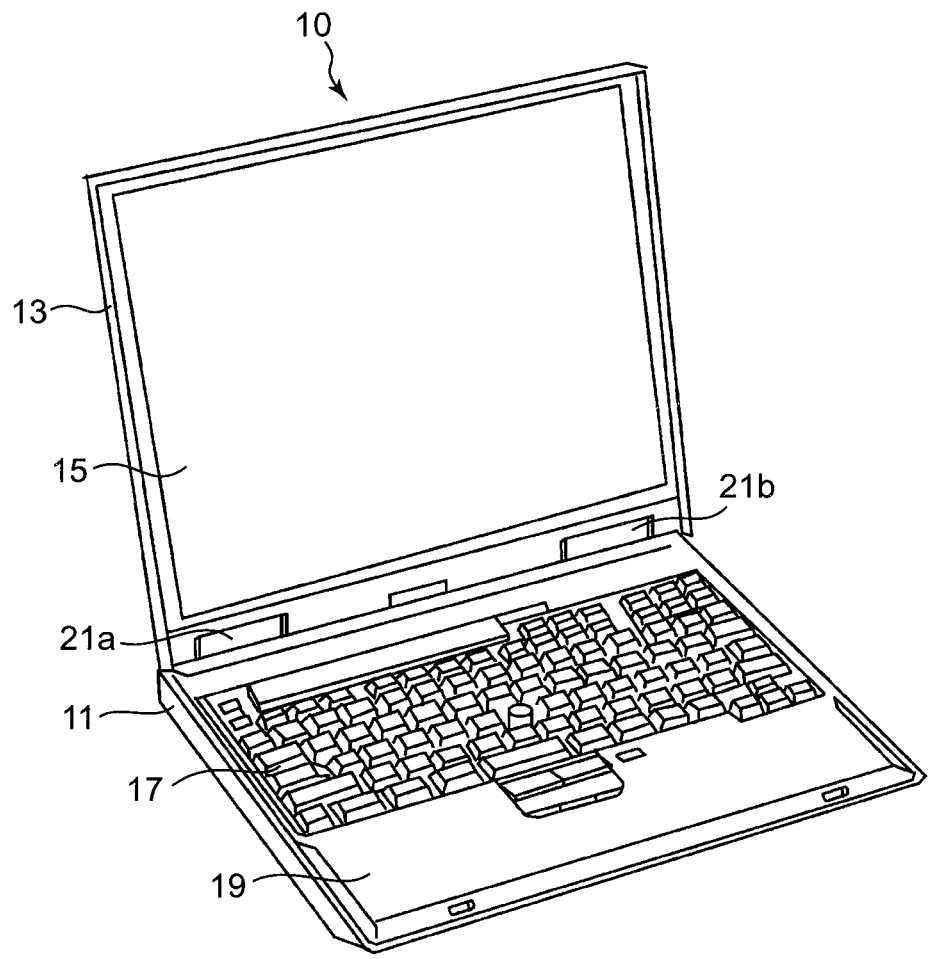
FIG. 1 is a perspective view illustrating an outer appearance of a notebook PC 10 according to an embodiment of the present invention.

Therefore, according to at least one presently preferred embodiment of the present invention there is broadly contemplated herein an electronic apparatus which achieves good antenna characteristics, while being thin in size and light-weight. FIG. 1 is a perspective view according to at least one embodiment illustrating an outer appearance of a notebook PC 10. The notebook PC 10 has a liquid crystal display (LCD) module 15 accommodated in a display casing 13. A system casing 11 accommodates system devices such as a processor, a motherboard, a wireless module and a hard disk drive. A keyboard assembly 17 and a keyboard bezel 19 are mounted on an upper surface of the system casing 11. The system casing 11 and the display casing 13 are openably coupled to each other via hinge portions 21a and 21b.

Figure 2:
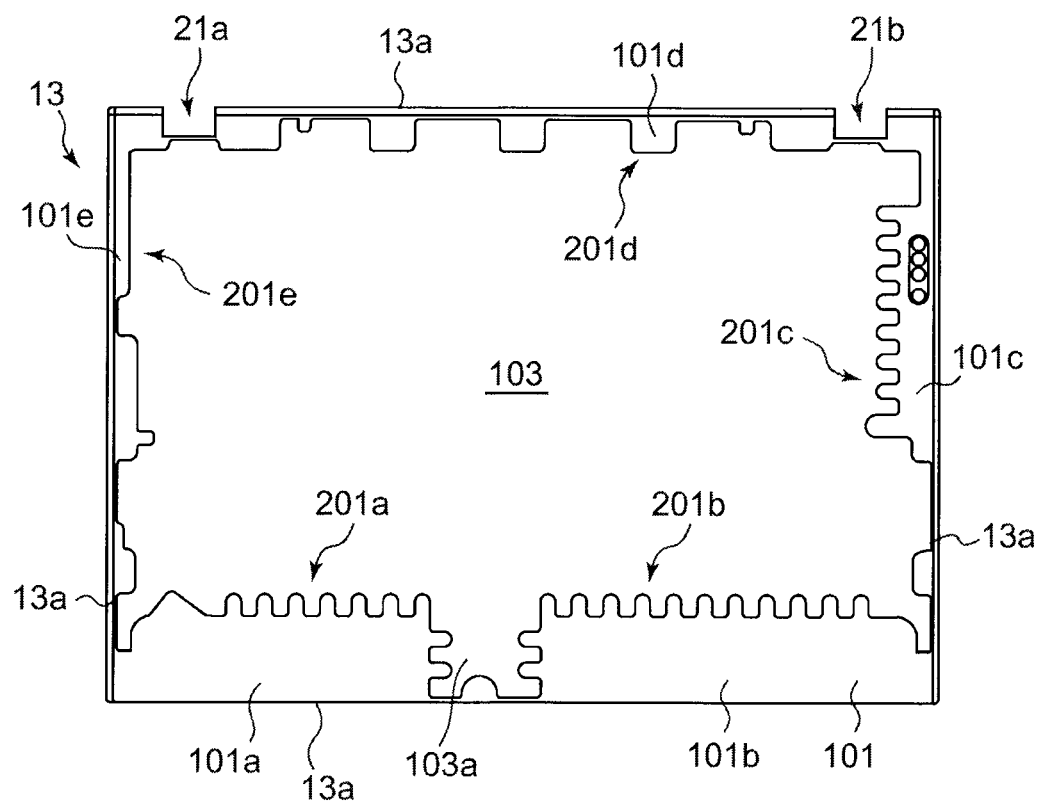
FIG. 2 is a top plan view illustrating an inner surface of a display casing in which an LCD module is accommodated.

FIG. 2 is a top plan view according to at least one embodiment of the present invention illustrating an inside of the display casing 13 in which the LCD module 15 is accommodated. The hinge portions 21a and 21b are positioned on the upper side of FIG. 2. The display casing 13 has strengthening function of accommodating the LCD module 15 and protecting the display module 15 from an external pressing force and also has designing function that an outer surface thereof constitutes an outer appearance of the notebook PC 10. Therefore, on a display side, there is no need to have a special frame member for securing strength in addition to the display casing 13.

The display casing 13 is formed by two regions: a glass fiber reinforced plastic (hereinafter, referred to as "GFRP") region 101 formed of a nonconductive material and a carbon fiber reinforced plastic (hereinafter, referred to as "CFRP") region 103 formed of a conductive material. The GFRP region 101 is disposed in a peripheral portion of the display casing 13 and constitutes sidewalls 13a for forming the inside into a box-like shape. In the GFRP region 101, antenna regions 101a and 101b, an indicator region 101c, and the other regions 101d and 101e are representatively depicted. The CFRP region 103 is disposed in the central part of the display casing 13 so as to occupy the whole areas. The GFRP and the CFRP are both based on nylon.

The antenna regions 101a and 101b and the indicator region 101c are configured to extend toward the central part from the sidewalls 13a so that their boundaries 201a to 201c with the CFRP region 103 are formed into a regular waveform. The antenna regions 101a and 101b are used as spaces for mounting an antenna of, for example, a LAN or a WAN. The indicator region 101c is used as a space for mounting a light emitting diode as an indicator. Moreover, the CFRP region 103 includes a camera region 103a for mounting a camera.

Figure 3:
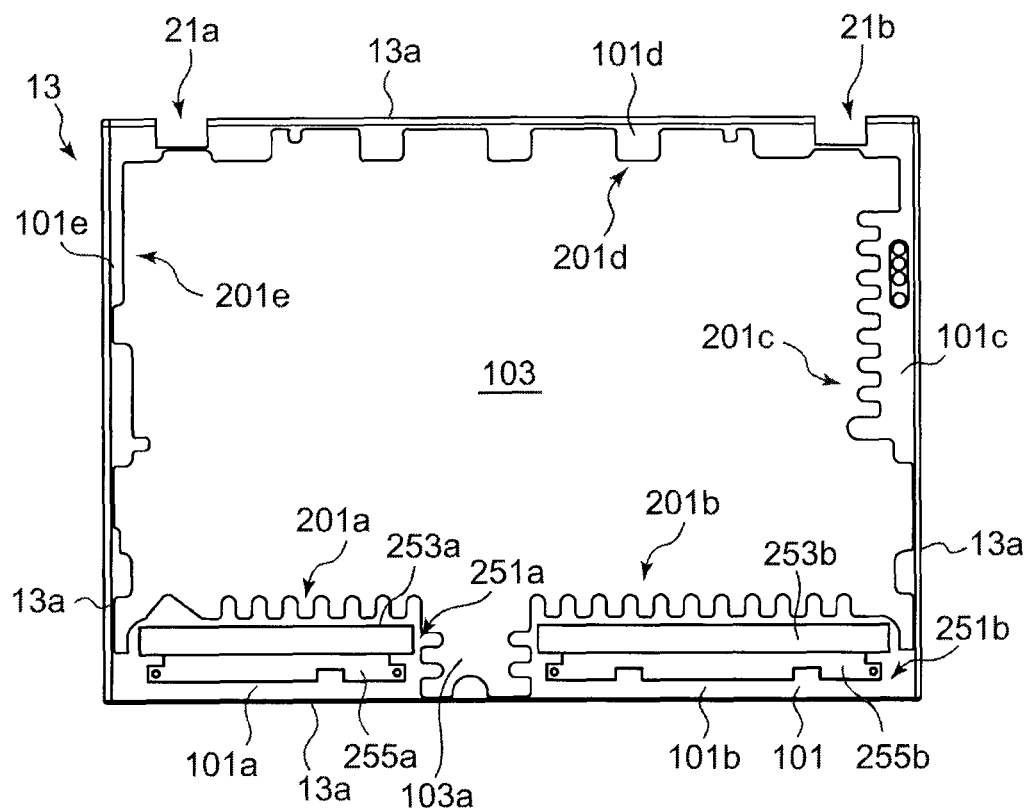
FIG. 3 is a top plan view illustrating a state where antennas are disposed in the display casing.

FIG. 3 is a top plan view according to at least one embodiment of the present invention illustrating a state where antennas 251a and 251b are arranged in the display casing 13. The antennas 251a and 251b are configured by radiation element portions 255a and 255b and ground sheets 253a and 253b, respectively. The antennas 251a and 251b are connected to a wireless module accommodated in the system casing 11. In the radiation element portions 255a and 255b, a plurality of radiation elements corresponding to respective frequency bands is attached to the frame formed of synthetic resin. The ground sheets 253a and 253b are formed of an aluminum foil. The antennas 251a and 251b are disposed to be positioned on the upper side when the display casing 13 is opened as shown in FIG. 1, in order to improve the antenna's radio wave sensitivity.

Figure 4:
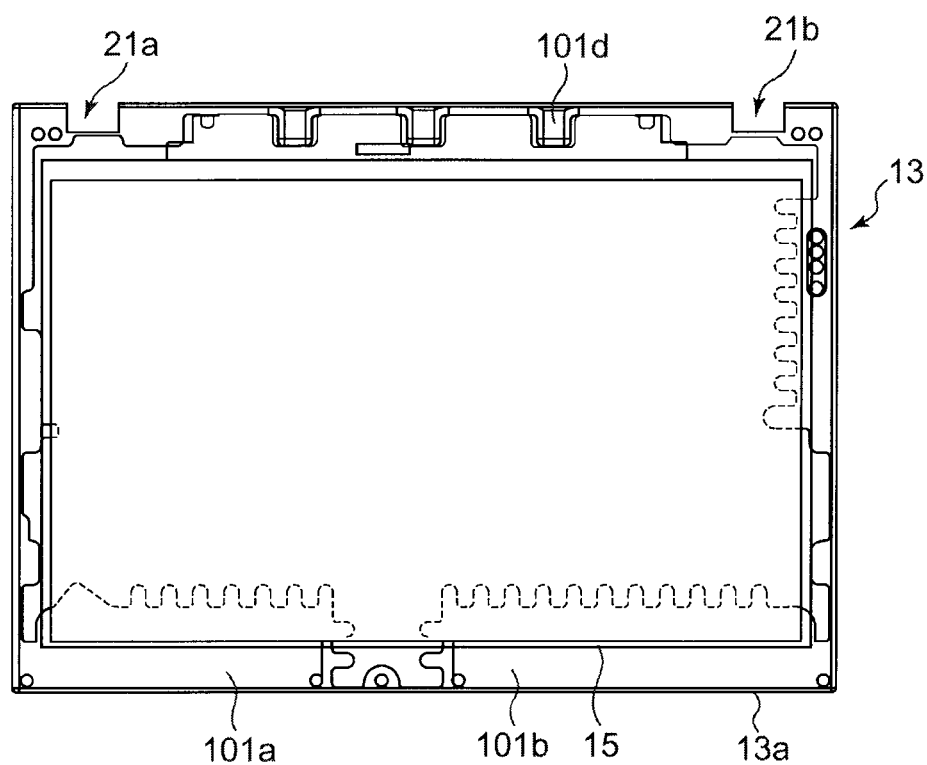
FIG. 4 is a top plan view illustrating a state where the LCD module is accommodated in the display casing.

FIG. 4 is a top plan view according to at least one embodiment of the present invention illustrating a state where the LCD module 15 is accommodated in the display casing 13. As is clear from FIGS. 3 and 4, the antenna regions 101a and 101b are configured to extend a sufficient distance toward the central part from the sidewalls 13a so that the whole body of each antenna 251a and 251b can be mounted thereon. As a result, joint portions of the antenna regions 101a and 101b and the CFRP region 103 are in a projection area of the LCD module 15 with respect to the bottom surface. Since the whole body of each antenna 251a and 251b can be arranged within the antenna regions 101a and 101b formed of a nonconductive material, it is possible to obtain a good radio wave characteristic. Specifically, the antennas 251a and 251b are arranged such that the radiation element portions 255a and 255b are disposed between inner surfaces of the sidewalls 13a of the display casing 13 and the LCD module 15, and most parts of the ground sheets 253a and 253b are disposed between the LCD module 15 and the antenna regions 101a and 101b.

Here, a description of a joint structure between the GFRP region 101 and the CFRP region 103 will be described. The GFRP region 101 and the CFRP region 103 need to form a single body to secure strength of the display casing 13 such as by holding the LCD module 15 or enduring an external pressing force. Therefore, the joint portions require a predetermined strength. As illustrated in FIG. 2, the joint portions of the GFRP region 101 and the CFRP region 103 include butt joint portions 201a to 201c depicting regular waveforms in the bottom surface and lap joint portions 201d and 201e shown by straight lines. The lap joint portions 201d and 201e are only illustrations, and all joint portions of the GFRP region 101 and the CFRP region 103 other than the butt joint portions 201a to 201c are lap joined, that is, in an overlapping manner.

In the lap joint portions 201d and 201e, the GFRP region 101 is lap joined over the CFRP region 103 so that it bulges toward the inner side of the display casing 13. In the butt joint portions 201a to 201c, an end portion of the GFRP region 101 and an end portion of the CFRP region 103 are butt joined at contacting surfaces depicting regular corrugated curves such as waveforms in the bottom surface. Although the lap joining can provide higher strength than the butt joining, the lap joining is applied only to areas disposed outside the projection area of the LCD module 15 with respect to the bottom surface because the lap joint portions become thicker at the inner side. Alternatively, a method of the lap joining such that the GFRP region 101 bulges toward the outer side of the display casing 13 at the lap joint portions may be considered; however, such a method may not be applied because of designing problems.

In accordance with at least one presently preferred embodiment of the invention, the thickness of the CFRP region 103 is about 1.5 mm and the thickness of the antenna region 101a is about 1 mm to 1.5 mm. The CFRP region 103 is produced by cutting a laminated panel having an expanded layer sandwiched between two CFRP layers into the shape of the CFRP region 103 as shown in FIG. 2. By applying such a laminated panel to the central portion where it is necessary to increase the strength of the display casing 13, it is possible to produce the display casing 13 as being lightweight and having increased strength. Then, the display casing 13 is formed by injection molding in which the processed CFRP panel 103 is set on a metallic mold and a GFRP heated to be melt is press-fitted to the metallic mold.

Figure 5A:
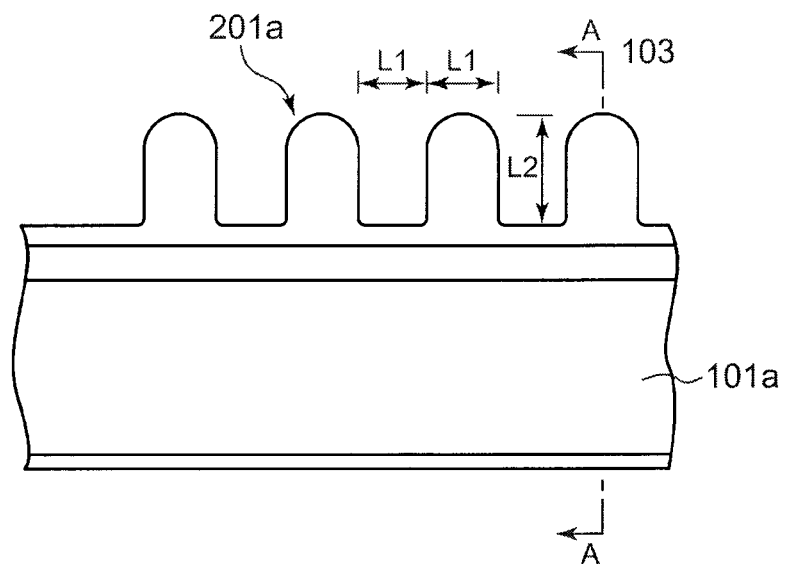
FIGS. 5 (A-C) are a top plan view and cross-sectional views illustrating a detailed structure of a joint portion.
Figure 5B:
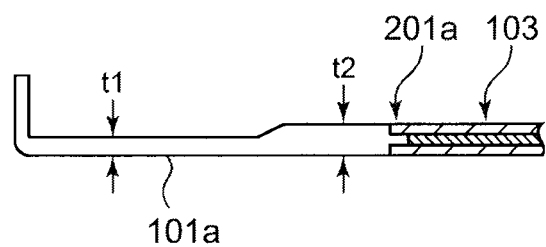
Figure 5C:
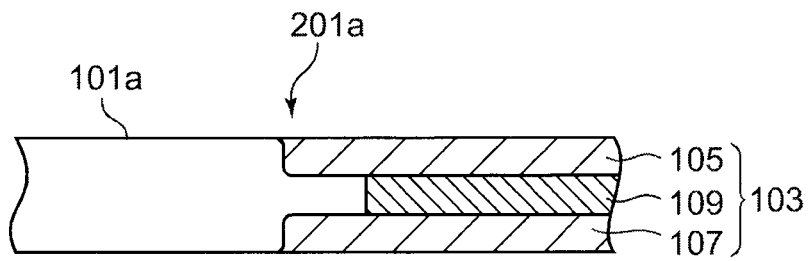

FIG. 5A is a top plan view according to at least one embodiment of the present invention illustrating a detailed structure of the antenna region 101a and the joint portion 201a. FIG. 5B is a cross-sectional view according to at least one embodiment taken along the arrows A-A in FIG. 5A, and FIG. 5C is an enlarged cross-sectional view according to at least one embodiment of the joint portion 201a. In FIG. 5B, a thickness t1 of a principal surface constituting the antenna region 101a is set to 1 mm; however, a thickness t2 thereof in the vicinity of a joint surface with the CFRP region 103 is set to 1.5 mm, which thickness is the same as the thickness of the CFRP region 103.

The antenna regions 101a and 101b are coupled with the camera region 103a by means of butt joining, so that it is possible to secure sufficient strength. Since the radiation element portion 255a of the antenna 251a can be arranged in a thin (thickness t1) part of the antenna region 101a, a space for the radiation element portion 255a of the antenna 251a can be provided in the thickness direction of the display casing 13, easing restrictions on an antenna design and thus obtaining a good antenna characteristic. Further, by allowing the antenna regions 101a and 101b to be thin, it is possible to achieve a light weight of the display casing 13.

In the joint portion 201a, an end portion of the antenna region 101a and an end portion of the CFRP region 103 are contacted each other in a curved surface depicting a regular corrugated line and having a width L1 of about 6 mm and a length L2 of about 7 mm as viewed in top plan view. The contacting surface may have other shapes as long as it can increase the size of contacting areas of two materials to thus increase the coupling strength. Since the CFRP region 103 has a laminated structure having the expanded layer 109 inserted between the CFRP layers 105 and 107, the GFRP melt in the process of the injection molding can partially come into the expanded layer 109, and thus, both of them can be firmly joined to each other as illustrated in FIG. 5C.

Referring to FIGS. 2 and 4, the joint portions 201a to 203d are in an orthographic projection area of the LCD module 15 with respect to the bottom surface and are thus hidden thereunder, but the joint portions 201d and 201e are positioned outside the orthographic projection area of the LCD module 15. Therefore, even when the joint portions 201d and 201e are lap joined with the GFRP region 101 at the inside of the CFRP layer 105, there is no problem in mounting the LCD module 15.

Since the joining between the camera region 103a and portions of the GFRP region 101 in the vicinity of the sidewalls 13a can be carried out by lap joining, it is possible to secure the strength of the camera region 103a. Moreover, by applying butt joining to the camera region 103a having increased strength, it is possible to secure the strength of the antenna regions 101a and 101b. In the joint portions 201a to 201c, butt joining is carried out, thus providing a flat mounting surface for the LCD module 15 to the bottom surface. Moreover, the outer surface of the display casing 13 is coated with paint so that the joint portions 201a to 201e are invisible from the outside.

While the present invention has been shown and described by way of particular preferred embodiments in conjunction with the drawings, the present invention is not limited to the disclosed embodiments. It is to be understood that the present invention may employ any configurations known in the art as long as they can attain the effects of the present invention, for example the present invention can be used in an electronic apparatus such as a portable computer or a mobile phone.

If not otherwise stated herein, it is to be assumed that all patents, patent applications, patent publications and other publications (including web-based publications) mentioned and/or cited herein are hereby fully incorporated by reference herein as if set forth fully in their entirety herein.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

What is claimed is:

1. An apparatus comprising:
a display casing, the display casing comprising:
   a conductive resin region in a central portion of the display casing;
   a nonconductive resin region forming a peripheral portion of the display casing substantially surrounding the conductive resin region, the nonconductive resin region having an antenna mounting space disposed therein;
   wherein a joint between the nonconductive resin region and the conductive resin region forms a plurality of curves; and
   a display module accommodated in the display casing;
an antenna disposed in the antenna mounting space; and
a system casing rotatably coupled to the display casing.

2. The apparatus according to claim 1, wherein the conductive resin region comprises a carbon fiber reinforced plastic.

3. The apparatus according to claim 1, wherein the nonconductive resin region comprises a glass fiber reinforced plastic.

4. The apparatus according to claim 1, wherein the antenna is disposed only within the nonconductive resin region.

5. The apparatus according to claim 4, wherein the system casing comprises a wireless module in operable connection with the antenna.

6. The apparatus according to claim 5, wherein the nonconductive resin region, having the antenna disposed therein, is between 1 and 1.5 millimeters in thickness.

7. The apparatus according to claim 4, wherein the antenna further comprises:
a ground sheet element having at least a portion disposed between the display module and the nonconductive resin region; and
a radiation element being disposed between a sidewall of the display casing and the display module.

8. The apparatus according to claim 7, wherein the conductive resin region and the nonconductive resin region are butt joined in a projection area of the display module.

9. The apparatus according to claim 7, wherein the radiation element comprises a plurality of radiation subelements which correspond to respective frequency bands and are attached to a frame formed of synthetic resin.

10. The apparatus according to claim 7, wherein the ground sheet element is comprised of aluminum.

11. The apparatus according to claim 1, wherein the antenna is positioned on an upper side of the display casing so that when the display casing is opened the antenna has improved radio wave sensitivity.

12. The apparatus according to claim 1, wherein the conductive resin region is 1.5 millimeters in thickness.

13. An apparatus comprising:
a display casing, the display casing comprising:
   a conductive resin region in a central portion of the display casing; and
   a nonconductive resin region forming a peripheral portion of the display casing substantially surrounding the conductive resin region, the nonconductive resin region having an antenna mounting space disposed therein;
   wherein a joint between the nonconductive resin region and the conductive resin region forms a plurality of curves.

14. The apparatus according to claim 13, further comprising:
a display module accommodated in the display casing; and
an antenna disposed within the antenna mounting space.

15. An apparatus comprising:
a system casing; and
a display casing rotatably coupled to the system casing, the display casing comprising:
   a conductive resin region in a central portion of the display casing; and
   a nonconductive resin region forming a peripheral portion of the display casing substantially surrounding the conductive resin region, the nonconductive resin region having an antenna mounting space disposed therein;
   wherein a joint between the nonconductive resin region and the conductive resin region forms a plurality of curves.

16. The apparatus according to claim 15, wherein the conductive resin region comprises a carbon fiber reinforced plastic.

17. The apparatus according to claim 15, wherein the nonconductive resin region comprises a glass fiber reinforced plastic.

18. The apparatus according to claim 15, wherein an antenna is disposed within the antenna mounting space only within the nonconductive resin region; and wherein the antenna comprises a ground sheet element having at least a portion disposed between a display in the display casing and the nonconductive resin region and a radiation element being disposed between a sidewall of the display casing and the display.

19. The apparatus according to claim 18, wherein the system casing comprises a wireless module in operable connection to the antenna.

* * * * *